United States Patent [19]

Nichols et al.

[11] Patent Number: 4,971,397
[45] Date of Patent: Nov. 20, 1990

[54] TUFFNUT (BICYCLE WHEEL MOUNTING ASSEMBLY)

[76] Inventors: Alan Nichols; Eric Kupferberg, both of 230 Park St., Copiague, N.Y. 11726

[21] Appl. No.: 356,469

[22] Filed: May 25, 1989

[51] Int. Cl.$^5$ .............................................. B60B 27/06
[52] U.S. Cl. .................................. 301/105 B; 301/111
[58] Field of Search ..................... 301/105 B, 111, 114, 301/115, 124 R; 411/272, 273, 432

[56] References Cited

U.S. PATENT DOCUMENTS

| | | | |
|---|---|---|---|
| 3,922,018 | 11/1975 | Shook | 301/105 B |
| 4,400,038 | 8/1983 | Hosokawa | 301/125 X |
| 4,405,180 | 10/1983 | Butz | 301/111 |
| 4,763,957 | 8/1988 | Poehlmann et al. | 301/105 B |

Primary Examiner—Russell D. Stormer
Attorney, Agent, or Firm—T. M. Gernstein

[57] ABSTRACT

A bicycle wheel mounting assembly includes an inner sleeve that is hand-threaded onto external threads of a solid bicycle wheel axle. An operating handle includes two cams eccentrically mounted thereon and is rotatably mounted on the inner sleeve to rotate those cams about an axis that extends transverse to the inner sleeve longitudinal axis. An outer sleeve is mounted on the inner sleeve to be moved longitudinally of the inner sleeve by the cams. The inner sleeve is hand tightened onto the axle until the outer sleeve abuts the bicycle wheel, whereupon rotation of the operating handle causes the cams to force the outer sleeve forward so as to force the bicycle wheel snugly against the bicycle frame. A boot is also included, and the entire assembly thus includes quick-release features.

7 Claims, 2 Drawing Sheets

TUFFNUT (BICYCLE WHEEL MOUNTING ASSEMBLY)

TECHNICAL FIELD OF THE INVENTION

The present invention relates to the general art of land vehicles, and to the particular field of bicycles, specifically, bicycle accessories.

BACKGROUND OF THE INVENTION

Bicycles, such as all-terrain bicycles, BMX bicycles, and the like, often require the wheels thereof to be changed. It is often desirable, for many reasons, to effect such change in as rapid an expeditious a manner as possible. It is also desirable that such changes be made with as little manipulation of tools as possible.

On the other hand, such rapid changing of a wheel must not be effected in a manner that endangers either the wheel or the bicycle. This requirement is especially troublesome if the wheel uses a hollow axle as is often used in such bicycles. A hollow axle may be weaker than a solid axle, and thus more prone to damage from special tools or the like used to change wheels.

However, a solid axle may require special tools to change the bicycle wheels, and even then, such removal may be difficult and time consuming.

Accordingly, there is a need for a means for locking a bicycle wheel to a bicycle frame in a secure yet expeditious manner that will permit the use of a solid axle.

OBJECTS OF THE INVENTION

It is a main object of the present invention to provide a means for securely mounting a bicycle wheel to a bicycle frame in a manner that still permits expeditious removal of that wheel.

It is another object of the present invention to provide a means for securely, yet expeditiously, mounting a bicycle wheel having a solid axle to a bicycle frame.

It is a specific object of the present invention to provide a locking nut assembly for use with a bicycle wheel having a solid axle.

SUMMARY OF THE INVENTION

These, and other, objects are accomplished by a nut assembly for locking a bicycle wheel to a solid bicycle axle which includes a lever-like operating handle and cam mechanism which co-operate with an inner sleeve threadably mounted to exterior threads of that solid axle. The assembly includes an outer sleeve that engages the wheel and is moved with respect to the inner sleeve by the cams to force the wheel against the frame on operation of the handle.

In this manner, a solid axle can be used and a superior mechanical advantage can be achieved with an easy operation that does not require special tools to effect. Multiple assemblies can be used with one on each end of each axle of the bicycle to permit securing of each wheel individually, yet each Wheel can be mounted or removed quickly and easily without special tools.

DETAILED DESCRIPTION OF THE PREFERRED EMBODIMENT OF THE INVENTION

Figure 1:
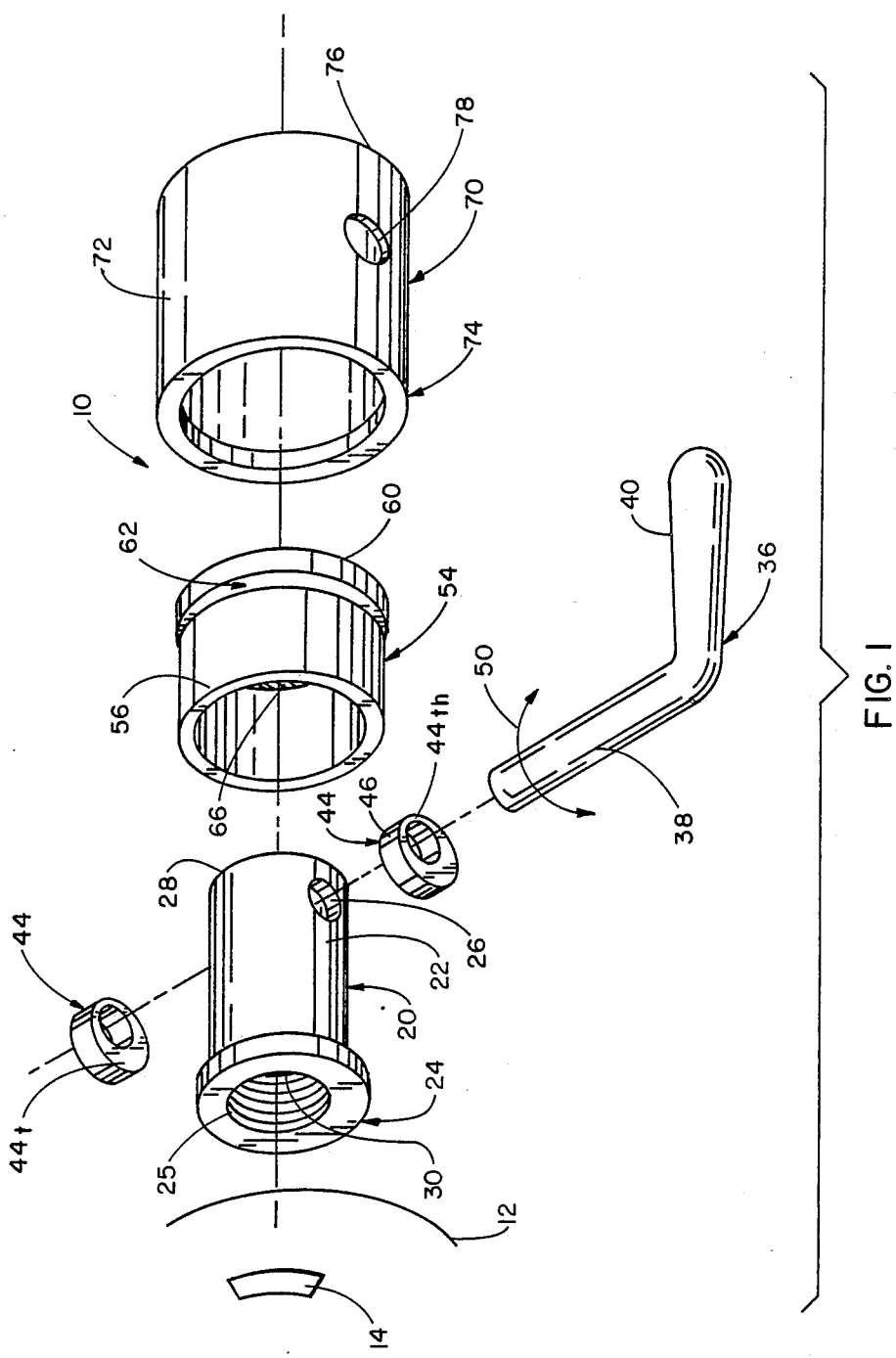
FIG. 1 is an exploded perspective of the nut assembly of the present invention.

Shown in FIG. 1 is a nut assembly 10 of the present invention. The nut assembly 10 is used to secure a bicycle wheel, indicated in FIG. 1 at 12 to a bicycle frame, indicated in FIG. 1 at 14 having a solid axle having exterior threads on an outer end thereof.

The assembly 10 includes a an elongate inner sleeve 20 having a cylindrical tubular body 22. An annular flange 24 is located on a forward end 25 of the body 22, and a pair of openings, such as opening 26, are located near a rear end 28 of the inner sleeve body. The openings are located to be on opposite ends of a diameter passing transversely through the body 22. The body 22 includes a bore 30 which passes longitudinally therethrough, and threads 32 are defined on the body in the bore to co-operatively associate the inner sleeve with the exterior threads of the solid axle.

As will be apparent from the ensuing discussion, hand pressure is sufficient to mount the inner sleeve on the solid axle securely enough for securely mounting the bicycle wheel to the frame.

The annular flange 24 has an outer diameter that is greater than the outer diameter of the body for a purpose to be discussed below.

As can be seen in FIG. 1, the assembly 10 further includes an L-shaped operating handle 36 having a long leg 38 adapted to extend through the openings 26 of the body 22, and a short leg 40 that is adapted to be grasped by an operator.

A pair of cams 44 are eccentrically mounted on the handle long leg 38 to be located closely adjacent to the outer surface of the body 22. Each cam includes an outer cam surface 46 that moves longitudinally with respect to the longitudinal axis of the body 22 as the handle 36 is rotated about the longitudinal centerline of the long leg. Rotation of the handle is indicated in FIG. 1 by the arrow 50, and the aforementioned movement of the cam outer surfaces is a result of the eccentric mounting of the cams as will occur to those skilled in the art. The purpose of such movement will be apparent from the ensuing discussion.

The assembly 10 further includes an outer sleeve 54 having a cylindrical hollow body 56 which includes a front end 58 and a rear end 60 and has a grove 62 defined in the outer surface thereof to be located near the rear end 60. The sleeve 54 includes a bore extending longitudinally therethrough, and has an inner diameter that essentially matches the outer diameter of the inner sleeve flange 24 so that the outer sleeve slidingly rests on the flange 24. An inwardly extending annular flange 66 is located on the rear end of the outer sleeve, and has an inner diameter that essentially matches the outer diameter of the inner sleeve outer surface so that the outer sleeve is securely and slidingly supported on the inner sleeve by the flanges 24 and 66.

The outer sleeve has an axial length as measured between the front end 58 and the rear end 60 that is essentially equal to the axial distance between the forward end 25 of the body 22 and the cam surfaces 46 when the cams 44 are in the position rotated about 180° from the position shown in FIG. 1. Since the cams are eccentrically mounted, rotation of the handle will move the cam surfaces toward the forward end of the inner sleeve as the thicker portion of the cams is moved between the openings and the flange 24.

Stated another way, the outer sleeve is sized to be engaged at its rear end 60 by the cams 44, and each cam includes a thick portion, 44t and a thin portion 44th, with rotation of the handle moving the thick and thin portions relative to the inner sleeve. The length of the outer sleeve is adjusted so that the front end 58 of the outer sleeve is co-planar with the front end 25 of the inner sleeve when the cam thin portions are engaged against the outer sleeve rear end 60. In this manner, rotation of the handle 36 causes the outer sleeve to move forwardly of the inner sleeve so that the outer sleeve front end 58 moves in front of the inner sleeve forward end 25. The forward direction of the assembly is taken as that direction toward the wheel 12 and its associated bicycle frame 14.

The nut assembly 10 further includes a boot 70 that can be rubber or the like, and which includes a cylindrical, hollow body 72 having a forward end 74 and a rear end 76 and a bore extending longitudinally therethrough. The boot 70 has an inner diameter that essentially matches the outer diameter of the outer sleeve, and a sealing ring-like element 77 is mounted in the groove 62 to slidingly seal the boot to the outer sleeve.

The boot includes a pair of openings, such as opening 78 shown in FIG. 1, through which the handle long leg 38 is received. The boot is slidingly mounted on the outer sleeve for permitting the outer sleeve to move into and out of the boot as will be seen from the ensuing discussion.

Figure 2:
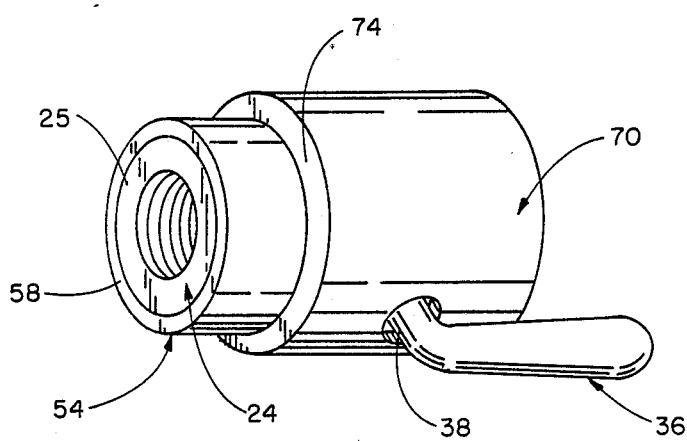
FIG. 2 is a perspective of the assembled nut assembly of the present invention.
Figure 3:
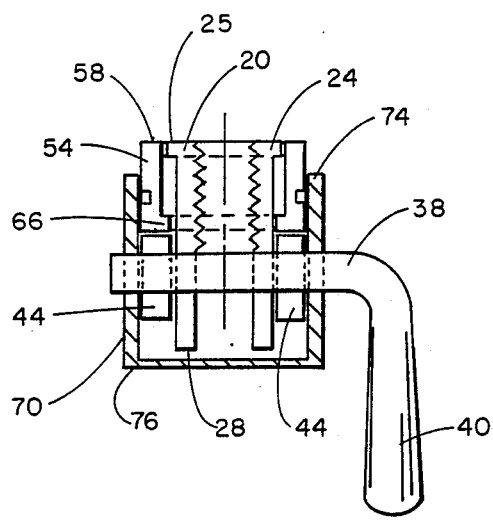
FIG. 3 shows the nut assembly in position just engaging a bicycle wheel just prior to locking.
Figure 4:
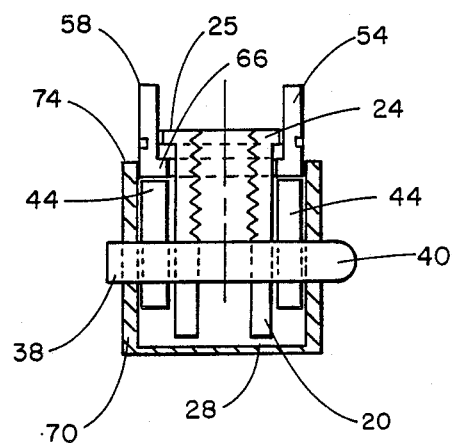
FIG. 4 shows the nut assembly in a locked configuration.

As can be seen by comparing FIGS. 2, 3 and 4, rotation of the handle 36 90° from the FIG. 3 orientation rotates the cams 44 to move the thin portion thereof from engagement with the rear of the outer sleeve and to gradually move the cams so that the thicker portions thereof engage the rear of the outer sleeve. This causes the outer sleeve to move from the FIG. 2 and FIG. 3 position on the inner sleeve to the FIG. 4 position on the inner sleeve.

The nut assembly is initially hand tightened onto the axle by means of the axle and inner sleeve threads until the inner sleeve front end 25 engages the wheel 12 and presses same against the bicycle frame. Accordingly, the aforediscussed movement of the outer sleeve in response to the rotation of the handle 36 forces the wheel securely against the frame due to the forward movement of the outer sleeve in response to the rotation of the eccentrically mounted cams 44. Use of the L-shaped handle enables such wheel to be moved using a mechanical advantage associated with such handle thereby ensuring secure mounting of the wheel to the bicycle without the need of special tools.

The outer sleeve is moved back from the FIG. 4 position to the FIG. 3 position by manually pushing such sleeve backwards after the handle 36 has been rotated back to the FIG. 3 position.

The inner sleeve threads can be designed to extend for only a prescribed distance along the inner surface of the inner sleeve, and since the handle long leg 38 extends across the bore of the inner sleeve at a prescribed location, there is a means included on the assembly 10 that prevents overtightening the assembly on the wheel axle. The cams 44 can also be sized to prevent further overtightening of the wheel against the frame upon full actuation of the handle, either by rotation 90° or more.

There can be a nut assembly 10 on each end of each axle of the bicycle, so that there are four such assemblies included. Use of multiple assemblies ensures a secure placement of the wheels on the bicycle, yet due to the ease of the action of each assembly, the wheels can be placed and removed in an easy and expeditious manner. The assemblies are preferably manufactured of steel-like materials, but other materials, such as aluminum, or the like, can also be used without departing from the scope of the present invention disclosure.

The assembly 10 is used in conjunction with a solid axle, and thus permits use of such element for a bicycle, and the use of two cams per assembly adds security to the connection of the assembly to the bicycle.

It is to be understood that while certain forms of the present invention have been illustrated and described herein, it is not to be limited to the specific forms or arrangement of parts described and shown.

We claim:

1. A nut assembly for mounting a bicycle wheel to bicycle frame comprising:
   (A) a solid axle on a bicycle wheel, said solid axle including outer ends which extend through a bicycle frame and which include exterior threads thereon;
   (B) an elongate inner sleeve which includes
      (1) a cylindrical hollow body having an outer diameter, an outer surface, a forward end a rear end, and a longitudinal bore defined therethrough,
      (2) an annular flange on said forward end of said hollow body, said flange having a prescribed outer diameter which is greater than the outer diameter of said inner flange hollow body,
      (3) internal threads on said body in said longitudinal bore and extending to said forward end, said internal threads being sized to co-operate with said solid axle external threads for threadably securing said inner sleeve onto said solid axle,
      (4) a pair of openings defined in said body to be on opposite ends of a diameter of said cylindrical body adjacent to said body rear end;
   (C) an L-shaped operating handle having one leg extending through said openings to mount said handle on said inner sleeve body and being mounted on said inner sleeve to rotate about an axis extending through the longitudinal axis of said one leg,
   (D) a pair of cams fixedly and eccentrically mounted on said handle one leg to rotate therewith with respect to said inner sleeve;
   (E) an elongate hollow cylindrical outer sleeve having a front end and a rear end and being slidably mounted on said inner sleeve body to extend between said inner sleeve body forward end and said openings and being sized between said front and rear ends to have said eccentrically mounted cams abut said outer sleeve rear end for moving said outer sleeve with respect to said inner sleeve as said eccentrically mounted cams rotate upon rotation of said operating handle, said outer sleeve including a bore extending longitudinally therethrough, said bore having a diameter essentially equal to the outer diameter of said inner sleeve annular flange so that said outer sleeve slidingly rests on said inner sleeve flange to be slidingly supported thereon; and
   (F) an elongate cylindrical boot which includes
      (1) a longitudinal bore having a diameter essentially equal to the outer diameter of said outer sleeve to rest on said outer sleeve, (2) a pair of openings defined in said boot to be on opposite ends of a diameter of said boot to receive said handle one leg therethrough.

2. The nut assembly defined in claim 1 wherein said solid axle includes two ends and there is one nut assembly on each end of said solid axle.

3. The nut assembly defined in claim 2 wherein said boot is formed of rubber.

4. The nut assembly defined in claim 2 further including means for preventing overtightening of said assembly on said axle.

5. The nut assembly defined in claim 1 wherein said cams are shaped to move said outer sleeve from a position spaced from a bicycle wheel to a position in engagement with said bicycle wheel upon rotation of said operating handle.

6. The nut assembly defined in claim 5 wherein said outer sleeve further includes a flange which slidingly engages said inner sleeve adjacent to the rear end of said inner sleeve.

7. The nut assembly defined in claim 1 wherein said boot includes a groove defined in an outer surface thereof near a rear end thereof, and said assembly further includes a ring like element positioned in said groove to slidingly engage said outer sleeve.

* * * * *